United States Patent [19]

Girault et al.

[11] 4,138,726
[45] Feb. 6, 1979

[54] AIRBORNE ARRANGEMENT FOR DISPLAYING A MOVING MAP

[75] Inventors: Herve Girault; Daniel Colas, both of Paris, France

[73] Assignee: Thomson-CSF, Paris, France

[21] Appl. No.: 810,983

[22] Filed: Jun. 29, 1977

[30] Foreign Application Priority Data

Jul. 2, 1976 [FR] France ............................... 76 20256

[51] Int. Cl.² ............................................. G06F 15/50
[52] U.S. Cl. .................................... 364/521; 340/24; 340/732; 353/12; 358/103; 364/443
[58] Field of Search ................ 364/518, 521, 443–450; 353/11, 12; 73/178; 340/24, 324; 358/87, 103, 104

[56] References Cited

U.S. PATENT DOCUMENTS

| 3,507,993 | 4/1970 | Mulley | 358/103 |
| 3,538,313 | 11/1970 | Thomas et al. | 353/12 |
| 3,580,978 | 5/1971 | Ebeling | 353/11 |
| 3,652,836 | 3/1972 | Richardson et al. | 364/450 |
| 4,071,895 | 1/1978 | Wood et al. | 364/449 |
| 4,086,632 | 4/1978 | Lions | 364/444 |

Primary Examiner—Felix D. Gruber
Attorney, Agent, or Firm—Karl F. Ross

[57] ABSTRACT

An airborne arrangement for displaying a moving map and aerial-navigation data such as symbols and characters on an electronic display screen is disclosed. It comprises a video map generator for converting the map to be displayed, carried on a film, into a video signal of the television type, a symbol generator which produces signals of the navigational data to be displayed with random scan, and an oscilloscope provided with switching circuits for consecutively displaying these items in the course of each frame cycle.

12 Claims, 6 Drawing Figures

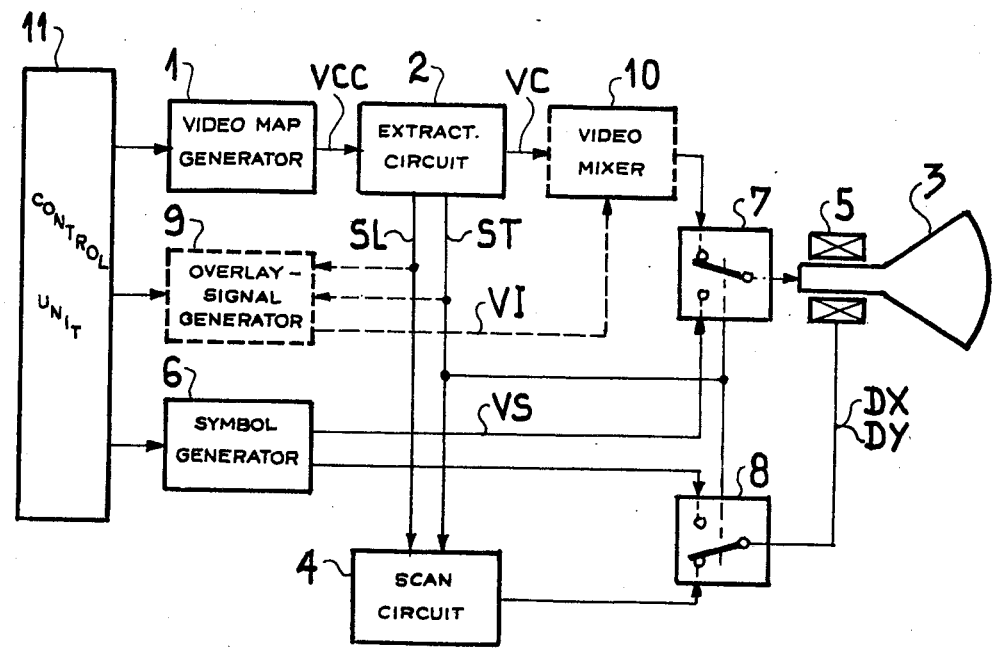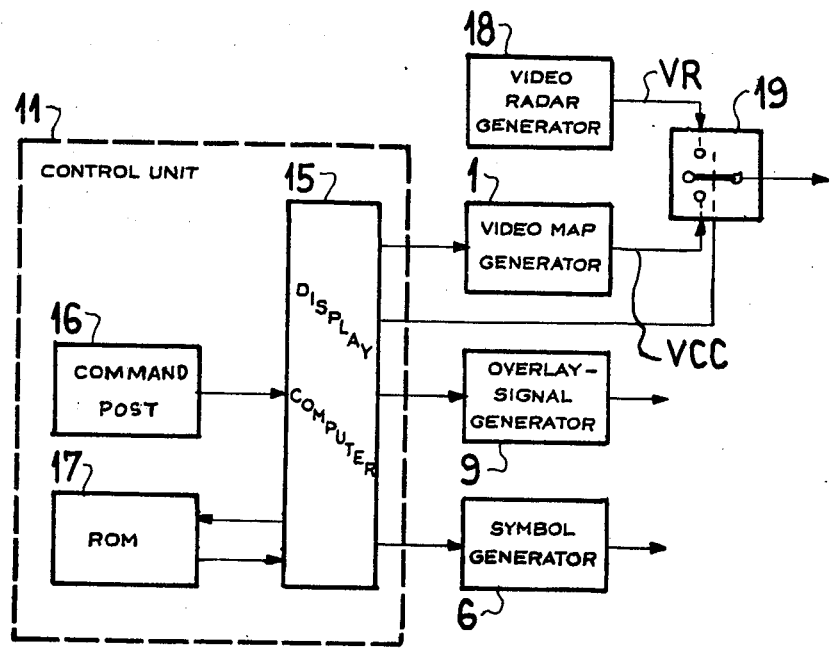

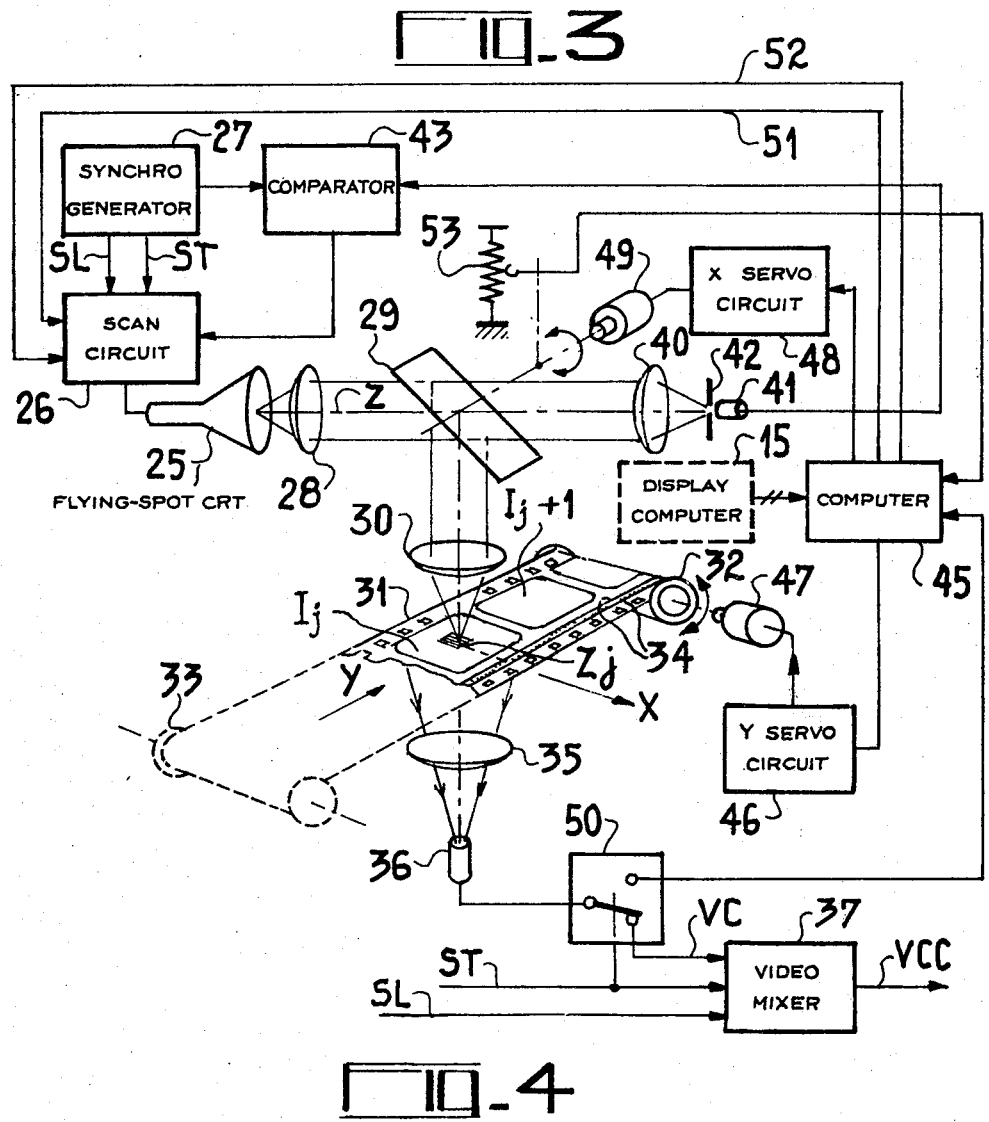

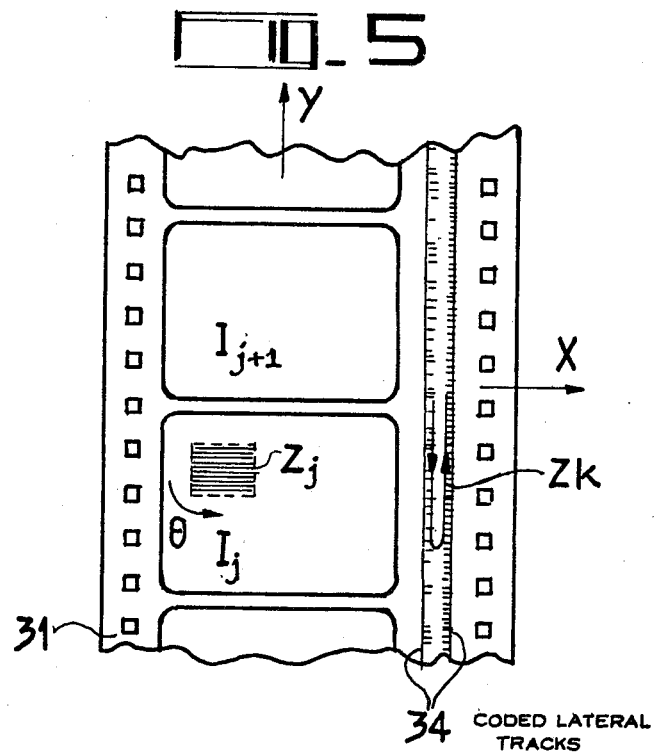
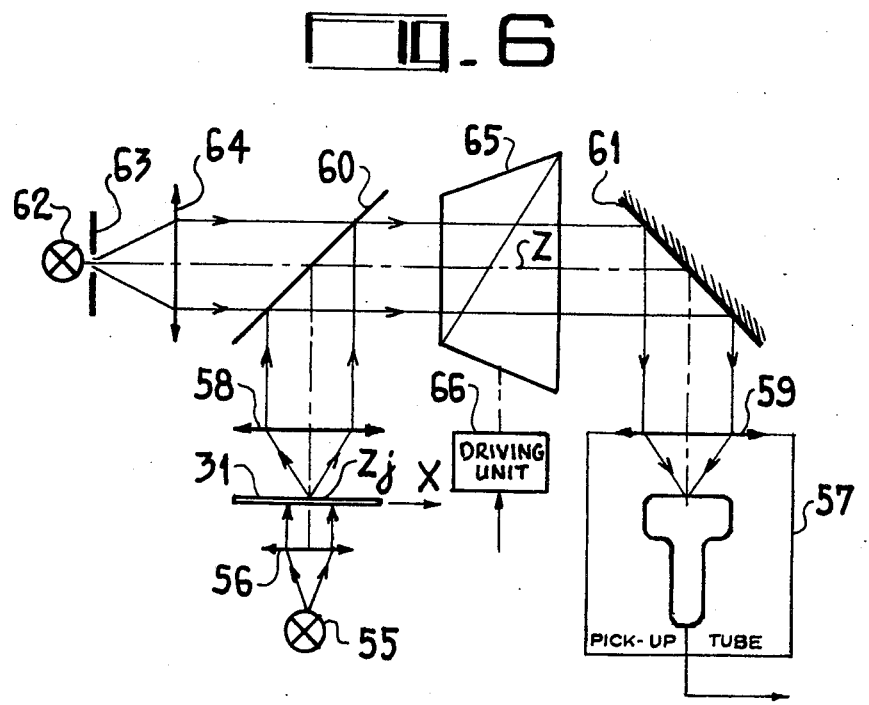

AIRBORNE ARRANGEMENT FOR DISPLAYING A MOVING MAP

FIELD AND BACKGROUND OF THE INVENTION

The present invention relates to an airborne arrangement for the combined display of a topographical moving map and navigational data.

Our invention is applicable to aerial-navigation systems, in which a moving-map display shows the pilot of an aircraft a topographical map which generally corresponds to the region being flown over. In this case, the positioning of the map in the cartesian X and Y directions and the rotational or angular orientation $\theta$ is controlled automatically as a respective function of the longitude, latitude and heading of the aircraft. The appropriate data (latitude, longitude, heading, etc.) are supplied by the navigational system of the aircraft. The moving-map display includes a computer which carries out servo-control operations in the X, Y and $\theta$ directions on the basis of the navigational data.

In addition to displaying a topographical or other kind of map, the system also produces an optically projected marker which generally indicates the present position of the aircraft, or else the aircraft's intended destination, or any other desired point on the map.

It is often useful to display other information for navigational purposes, such as speed, fuel consumption, or the course to be followed. This information is generally displayed by a cathode-ray trace employing random scanning in order to form the symbols or alphanumeric characters to be visualized.

According to a known technique, the image of the navigational data displayed on the screen of a cathode-ray tube is mixed optically with that of the movable map, the latter being produced by optical projection and the mixing being performed by means of a semi-reflective mirror. The assembly is arranged to project the two images at infinity and to perform the function of an optical collimator whereby the pilot can look through an optical pupil without the need for accommodation. In another known system, the images are displayed on the screen of a cathode-ray tube, the navigational data and the movable map being projected optically through the rear of the tube. Systems of this nature necessitate the use of a very special tube known as an optical-window tube.

In both of the above arrangements, the opto-mechanical assembly concerned with the projection of the movable map must be situated at only a short distance from the plane of display. Such equipment is heavy, bulky and expensive and takes up a considerable amount of space on the instrument panel, inasmuch as it is usually situated in a low-down viewing position.

OBJECT OF THE INVENTION

The general object of our present invention is to overcome such drawbacks by providing a display arrangment which operates by alternating electronic scans to combine the display of the map with that of the navigational data.

SUMMARY OF THE INVENTION

In accordance with a feature of our invention, an airborne arrangment for the combined display of a moving map and aerial-navigation data comprises a television monitor for displaying a movable image of a map stored on a film, servomechanical means for controlling the position of the image as a function of the latitude, longitude and heading of the aircraft, a generator assembly for producing video map signals corresponding to the image to be displayed along with line and frame synchronizing signals conforming to a line-by-line scan, and a symbol generator for producing the navigational data in the form of synthetic video signals conforming to a random scan. The monitor includes switching circuits operated by the frame signal to change over between the video signals and the scan signals and to allow the aerial-navigation data to be displayed, following each display of the image of the map, during the frame blanking period.

BRIEF DESCRIPTION OF THE DRAWING

The above and other features of our invention will now be described in detail with reference to the accompanying drawing in which:

FIG. 1 is a simplified diagram of a display arrangement according to the invention;

FIG. 2 is a diagram of part of the arrangement of FIG. 1 showing ancillary members forming a corresponding electronic navigational display system;

FIG. 3 is a more detailed view of a preferred embodiment of a video map generator illustrated in block form in FIG. 1;

FIG. 4 is a table serving to explain the principle of subdividing a map to form a film;

FIG. 5 is a view of part of a film showing the regions which are examined with the generator shown in FIG. 3; and FIG. 6 is a diagram of another embodiment of the video map generator of FIG. 1.

SPECIFIC DESCRIPTION

The display arrangment generally illustrated in FIG.1 includes an assembly 1 for generating a composite map signal VCC. This signal is designed for a line-by-line display of television type and consists of a video map signal VC, a line synchronizing signal SL and a frame synchronizing signal ST. An extractor circuit 2 enables the video signal and the synchronizing signals to be separated. During the working period of the frame cycle, the video signal VC is transmitted to an oscilloscope comprising a cathode-ray tube 3. A scan circuit 4 converts the synchronizing signals SL and ST into the deflection signals DX and DY required for the line-by-line scan which is to be produced. These deflection signals are applied to electrostatic or electromagnetic deflecting members such as the coils indicated at 5.

During the flyback period of the frame cycle, symbols or alphanumeric characters are displayed with the aid of a random scan. The appropriate video signal for this presentation is generally termed synthetic video and is designated VS in the FIGURE. The VS signal and the appropriate delfection signals DX and DY for each trace to be produced are supplied by a symbol generator 6. Two switching circuits 7 and 8, which are operated periodically by the frame signal, and more specifically by the leading edge of the frame blanking signal, enable the switching of the video and beam-deflection channels, respectively.

It is understood that this diagram is a general one which allows the functional structure to be shown at the expense of a certain amount of simplification. In particular, the video map signal VC is applied to a grid of the cathode-ray tube 3 after passing through reception circuits which are not shown, and the video-symbol signal VS is applied in the form of a brightening signal to the electron-emitting cathode. The corresponding amplifying circuits are also not shown.

The volume of the generator 1 is considerable since it contains the map stored on a positive film, feed means for transporting the film past optical devices, and other components described below. FIG. 1 shows that the generator 1 may advantageously be positioned remote from the tube 3 and thus away from the aircraft's instrument panel. The display arrangement proper may consist of a conventional monitor or receiver which incorporates the elements 2, 3, 4 and 5 supplemented by the switchover means 7 and 8.

The circuitry indicated in broken lines consists of a generator 9 producing video overlay signals VI which it is desired to show superimposed on the video map signal VC. These superimposition or overlay signals are combined with signal VC in a video mixing circuit 10. The signals VI produce a predetermined amplitude change (increase or decrease) of signal VC so as to cause one or more symbols of predetermined configuration to appear at selected locations on the screen, these symbols representing for the viewer information additional to that which is formed elsewhere by means of the symbol generating circuit.

The arrangement as a whole is controlled from a block 11, which represents a control unit and which includes in particular a display computer. In FIG. 2 we have shown the computer at 15; element 16 represents a command post on which the pilot's controls are grouped and element 17 represents a memory of the read-only type. The latter is intended to indicate during the flight which superimposed and symbol information is to be displayed and at what times. This memory 17 is programmed, accordingly, before the flight as dictated by the mission to be performed and may take the simple form of a magnetic-tape cassette or a semiconductor store, for example. On the basis of the flight program, the commands given by the pilot, and the positional and orientation information received from the navigation system (not shown), the display computer produces signals to control the aforementioned generators 1, 6 and 9 so as to cause the combined display required by the pilot to appear. Provision is also made for the map video channel VCC to be switched out at a command from the pilot and to be replaced by another video channel VR produced by an ancillary generator 18. The switching device, shown at 19, also has an off position. The video signal VR may, for example, be supplied by an airborne radar system or an infra-red camera.

FIG. 3 shows a preferred embodiment of the generator 1 producing the video map signal.

In this embodiment a dot-by-dot optical examination is performed by using a flying-spot scanning tube 25 provided with line-by-line scan circuits 26 and circuits 27 for generating the line and frame synchronizing signals SL and ST. The light radiation from the spot produced is picked up by an optical objective 28 and converted by the latter into a beam of parallel rays for the purpose of optical separation by a semi-reflective mirror 29 inserted in the optical path. This mirror is treated in such a way that it produces a second optical channel for monitoring the position of the scan, this second channel carrying only a small fraction of the light energy contained in the incident beam, for example a few percent. The remaining major fraction forms the principle channel which is used for scanning the map and in this instance is the channel reflected by the mirror. A second optical objective 30 acts to focus the beam and recreates a point of light representing the spot at the level of the image of the map to be analyzed.

The map is produced on a film 31 which is wound on spools 32 and 33. The film is obtained by taking successive shots of parts of the mapped area to be recorded, using a breakdown as shown in the diagram of FIG. 4. The breakdown into m rows and n columns involves the production of mn images, which are recorded photographically in the indicated order $I_1$ to $I_m$ and then $I_{m+1}$ to $I_{2m}$ and so on, which amounts to placing end-to-end the n successive vertical strips resulting from the breakdown. Two image areas $I_j$ and $I_{j+1}$ have been specifically illustrated in FIG. 3.

The scanning tube 23 performs a line-by-line scan which on the film results in a corresponding scan of a restricted zone $Z_j$ of the image $I_j$ concerned (FIG. 5). The film also includes, in accordance with known techniques, coded lateral tracks 34 to indicate the number of the image currently being scanned and the position of scan.

Downstream of the film lies an opto-electrical detection device consisting of an optical focusing objective 35 and a photodetector 36 which emits the video map signal VC. This signal is combined with the synchronizing signals SL and ST in a mixing circuit 37 to produce the signal VCC intended for the display assembly, which may thus be remotely situated.

The position of the scan on the tube is difficult to establish with the accuracy required to identify a reference point, generally the centerpoint of the zone $Z_j$, which is normally selected to indicate the present position of the aircraft. We therefore prefer to check on the position of the scan by means of the second optical channel whose beam is focused by the objective 40 and impinges on a photodetector 41 which may be preceded by a diaphragm 42. The position of the photodetector corresponds to that of the reference point which in the present case is assumed to be situated at the center of the screen of the tube. The cell 41 thus detects the passing of the spot during each frame scan. The corresponding detected signal is applied to a comparison circuit 43 which receives from the synchronizing generator pulses whose position in time corresponds to the X and Y co-ordinates of the reference point concerned. When the position of the scan varies from one frame scan to the next, circuit 43 emits error signals representing the longitudinal Y shift, i.e. the number of lines of displacement, and the transverse X shift, i.e. the displacement along the reference axis, which in the present case is the centerline. The comparison circuit may for example consist of a counting circuit to enable the periods of a high-frequency clock signal to be counted, in known fashion, to give an accurate indication of the displacements. Corresponding error signals are fed back to the scan circuit 26 to alter the deflection signals accordingly and to keep the center of the scan aligned with the center of the screen.

The cell 41 is set up beforehand so that its position coincides exactly with the planned reference point.

In the event that a color film is to be scanned, the elements 35 and 36 are supplemented by an optical chrominance discriminator to separate the various color channels, there being as many photodetector cells as there are color channels.

The position and the angular orientation of the scanned zone $Z_j$ relative to the scanned map section $I_j$, are slaved to the movements of the aircraft but can also be controlled by the pilot, as by manual shifts of the map. An on-board computer 45 receives data on the position and orientation of the aircraft from the display computer 15, representing the latitude, longitude and heading to be shown. On the basis of these data, the computer produces signals for controlling rotation $\theta$ and position in directions X and Y. The servo-control of position in direction Y comprises circuits 46 which feed a device 47 for driving the spools carrying the film. Rotation of the spools shifts the film parallel to direction Y in a sense corresponding to the sign of the positional error and for a distance sufficient to cancel out the error. The servo-control of position in direction X similarly comprises circuits 48 which feed a driving device 49. The latter acts on the angular position or tilt of the mirror 29 relative to the optical axis Z. The result is a transverse movement of the zone Zj in such a direction and to such an extent as to cancel out the error in the X position. The Y-position reference is supplied from information carried by the tracks 34. This information is read by making use of the scanning tube 25 during the frame blanking periods to produce a second scan in the lateral area of the film where the coded tracks are carried, these being shown in detail in FIG. 5. During the frame blanking period, which is made sufficiently long, the scan circuit 26 produces other deflection signals so that the spot of the tube is moved off center and scans a lateral zone Zk. The coding of the tracks is such as to identify the image number and the position. It consists of a coarse coding for the image number and reference positions on one track, and a precision coding for indicating position by means of a train of pulses on another track. Zone Zk is preferably examined by scanning the two coding tracks 34 in the Y direction as illustrated. The Y-position signals which are detected in this way by the cell 36 are transmitted to the computer 45 by means of a switching circuit 50, inserted in the output of the detector 36, which is controlled by the frame signal ST.

The X-position reference is supplied by an angular-position sensor, which may consist of a potentiometer 53 whose moving contact is shifted by the driving device 49 in synchronism with the rotary movement of the mirror 29. The voltage measured between the moving contact and a reference potential (ground) is representative of the angular position of member 29 and is applied to the on-board computer 45 to allow it to produce an error signal, by making a comparison with the received data on the position of the aircraft, which is applied to the servo-circuitry 48.

The objective 30 is designed to provide a sufficiently large field to cover the possible movements of zone Zj in the image in direction X. A more elaborate structure may be devised with an objective 30 of more restricted field provided that its linear position in direction X is servo-controlled in relation to the angular rotation of the mirror 29.

Another possibility is to hold the mirror 29 stationary and to move the film and spools as a whole in direction X. The X position is then fed back by means of a potentiometric sensor, for example, which is mounted on a carriage carrying the film and spools.

The angular reorientation $\theta$ of the map is caused by rotating the direction in which the spot sweeps across the screen, which results in an identical rotation of the zone of the scanned film about the reference point (FIG. 5). The servo-control of the position of this point ensures that the center of rotation remains fixed in transposition.

The degree of rotation specified by the display computer 15 is transmitted to the on-board computer 45, which controls the scan circuits 26 via a connection 51 to produce the appropriate deflection signals.

This rotation can be canceled by action on the part of the pilot. An order from the control station 16 is transmitted from the display computer 15 to computer 45, which cancels out the rotation.

The map can be shown on different scales by increasing or decreasing the dimensions of the zone Zj being scanned, this zone being spread over the entire face of the screen of the display tube 3.

The order for enlargement is given by the pilot and is transmitted via the control station 16 and the display computer 15 to the computer 45, which in turn controls the scan circuits 26 via a connection 52, to produce the appropriate deflection signals.

Provision may also be made for the displayed area to be off-centered so that its midpoint does not coincide with reference point, the offset being produced by video overlay using generator 9 and mixer 10 (FIG. 1).

The rotation, enlargement and off-centering of the scan are brought about by modifying the deflection signals by well known techniques, and the servo-control of the position of the reference point may similarly be performed by conventional techniques.

FIG. 6 shows another embodiment of the component 1 (FIG. 1) generating the video map signal. The zone Zj to be scanned is illuminated by means of a light source 55 which is positioned at the focus of an objective 56. An image of the zone is formed on the target of a television scanner tube or pick-up tube of a camera 57. The output signal of camera 57 is fed to the display tube or oscilloscope 3 of FIG. 1 via switches 7, 8. The light source 55 may consist of light-emitting diodes. The film 31 is placed in the focal plane of a second objective 58 which forms an image of this plane at infinity. This image is picked up by an entry objective 59 which precedes the scanner tube and which is focused on the target of the tube. The optical path includes a semi-reflective mirror 60 and a reflective mirror 61 deflecting the incident light rays onto the tube 57. The mirror 60 enables position-reference information produced by a second optical channel formed by a light source 62, a diaphragm or mask 63 and an optical objective 64 to be combined with the rays from the first optical channel described above. The combination of elements 62 and 63 produces a point of light or an illuminated reticle at the focus of the objective 64. This point is superimposed on the image projected upon the target and forms the visible reference point, which generally represents the position of the aircraft. As described in the case of FIG. 3, the X and Y movements of the film 31 are produced by rotating the mirror 60 and driving the spools. The frame blanking period, utilized for the display of navigational data as described above, is generated within tube 57 by the usual sweep Circuits replacing the scanning unit 26 of FIG. 3 and generating the sync signals SL, ST shown in FIG. 1.

The rotation of the map is brought about by an optical device, such as a so-called Pechan prism 65, which is rotated about the optical axis Z by a driving device 66 which may be controlled from the on-board computer (45, FIG. 3). The scanner tube may be of the vidicon type or may be a semiconductor matrix forming a charge-coupled device. The objective 59 may be of variable focal length to produce a desired enlargement.

In the case of a source 55 formed by light-emitting diodes, the diodes may emit in separate spectral bands corresponding to different colors. In conjunction with a color film it is possible, by selecting the diodes, to show only the parts of the map appearing in certain chosen and selectively allotted colors, with for example roads in yellow, waterways in blue, etc.

It will be understood that many modifications may be made without exceeding the scope of the invention, which is particularly distinguished by the combined presentation of a topographic moving map and aerial-navigation data on the screen of a cathode-ray tube or equivalent equipment, the image of the map being converted into a video signal.

By way of example, the prism-equipped rotating system 65, 66 of the embodiment shown in FIG. 6 may be introduced into the embodiment of FIG. 3 in which a scanning tube 25 is used in lieu of pick-up tube 57.

We claim:

1. An airborne display system installed aboard an aircraft for visualizing map sections and air-navigational data in flight, comprising:
   a map-signal generator for producing first video signals representing a section of a map of the territory overflown by the aircraft;
   scanning means synchronized with said map-signal generator for establishing a succession of frame cycles each divided into a working period and a flyback period;
   a source of air-navigational data;
   mechanism controlled by said source for varying the map section represented by said first video signals in conformity with the current position of the aircraft;
   symbol-generating means connected to said source for producing second video signals representing said air-navigational data;
   oscilloscope means provided with a screen for the display of said map section; and
   switchover means controlled by said scanning means for supplying an input of said oscilloscope means with said first video signals during working periods and with said second video signals during flyback periods of said frame cycles whereby symbolic representations of said air-navigational data are visually superimposed upon said map section on said screen, said oscilloscope means being provided with beam-deflecting means connected to said switchover means for energization in a line-by-line mode from said scanning means during said working periods and in a random-scan mode from said symbol-generating means during said flyback periods.

2. A system as defined in claim 1 wherein said map-signal generator comprises a support for a film carrying images of the map sections to be visualized, optical means for illuminating selected portions of said film, and photoelectric means for converting light from said illuminated portions into said first video signals.

3. A system as defined in claim 2 wherein said mechanism comprises first drive means for longitudinally displacing said film and second drive means for transversely displacing a zone of illumination, produced by said optical means, with reference to said film.

4. A system as defined in claim 3 wherein said optical means includes a tiltable mirror, said second drive means being coupled with said mirror for varying the angular position thereof relative to the plane of said film.

5. A system as defined in claim 4 wherein sid optical means further includes a cathode-ray tube provided with a scan circuit for sweeping a light spot by way of said mirror across a selected film portion constituting said zone of illumination.

6. A system as defined in claim 5 wherein said film has a lateral zone offset from said images carrying a position code, said second drive means being operable during said flyback periods to shift said light spot onto said lateral zone for reading said code and supplying corrective signals to said first drive means.

7. A system as defined in claim 5, further comprising a potentiometer mechanically coupled with said mirror for feeding back a position-indicating signal to said second drive means.

8. A system as defined in claim 5 wherein said mirror is semireflective for splitting luminous radiation from said cathode-ray tube into two separate beams, one of said beams being trained upon said film to form said light spot, further comprising photosensitive means in the path of the other of said beams for generating a reference signal upon being illuminated thereby, said reference signal being fed back to said scan circuit for keeping said zone of illumination centered on a predetermined point.

9. A system as defined in claim 4 wherein said optical means further includes a pick-up tube, said mirror directing light rays from said zone of illumination to said pick-up tube.

10. A system as defined in claim 9 wherein said mirror is semireflective, further comprising light-emitting means and lens means for focusing rays from said light-emitting means by way of said mirror upon said pick-up tube to illuminate a fixed reference point thereon.

11. A system as defined in claim 9 wherein said optical means further includes a rotatable prism interposed between said mirror and said pick-up tube, and third drive means for rotating said prism in response to heading information from said source.

12. A system as defined in claim 1, further comprising a generator of overlay signals and mixer means for superimposing said overlay signals upon said first video signals.

* * * * *